Oct. 10, 1939.   M. F. JUDD   2,175,399
FRICTION FACING AND METHOD OF MAKING SAME
Filed April 30, 1938   2 Sheets-Sheet 1
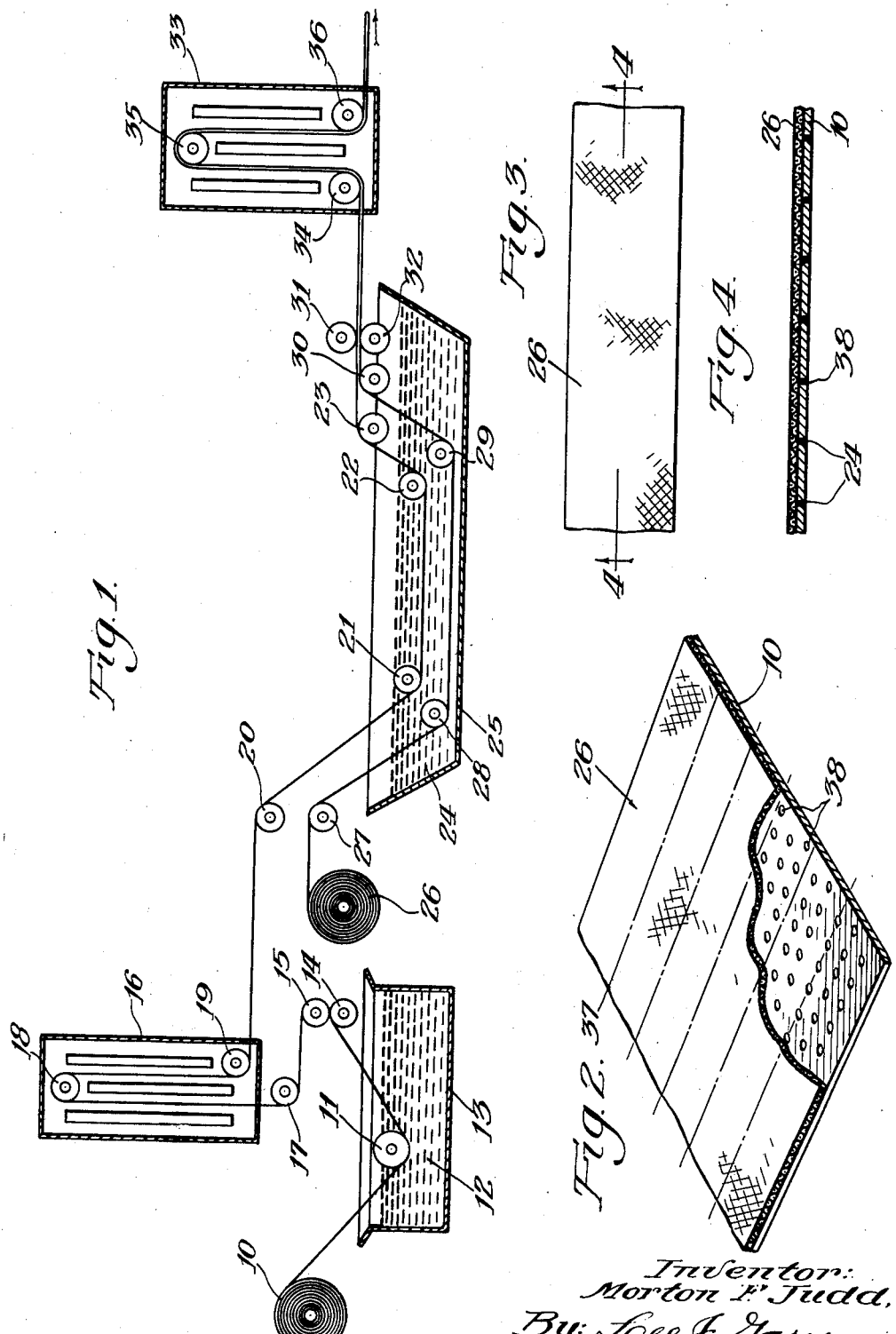
Inventor:
Morton F. Judd,
By: Lee J. Gary
Attorney.

Oct. 10, 1939.   M. F. JUDD   2,175,399
FRICTION FACING AND METHOD OF MAKING SAME
Filed April 30, 1938   2 Sheets-Sheet 2

Inventor:
Morton F. Judd.
By Lee J. Gary
Attorney

Patented Oct. 10, 1939

2,175,399

UNITED STATES PATENT OFFICE 2,175,399

FRICTION FACING AND METHOD OF MAKING SAME

Morton F. Judd, Stratford, Conn., assignor to Raybestos-Manhattan, Inc., Passaic, N. J., a corporation of New Jersey Application April 30, 1938, Serial No. 205,269

16 Claims. (Cl. 154—2)

This invention relates to improvements in friction elements, and particularly to friction discs or rings of the endless type suitable for automobile clutch facings, and more particularly to the formation of a convoluted bonded structure formed of a woven fabric reenforced, heat resisting or heat indestructable sheeted fibrous base.

For use in the modern high speed automobile it has been found essential that the clutch facing have great durability, have great resistance to wear which ordinarily takes place due to the friction engagement of an automobile clutch, which will have a desirable coefficient of friction and yet will not cause scoring of the plates throughout a long and strenuous life, and which will be able to withstand great centrifugal force developed at high rotative speeds. While providing a clutch facing which can withstand such hard and critical usage it becomes at the same time necessary to produce the same with economy and with controlled characteristics.

Friction elements of convoluted structure have heretofore been proposed and produced, although such methods have been subject to criticism due to impracticalities of construction and excessive cost. Previously, asbestos yarn, asbestos cloth and asbestos paper have been individually wound into tube form and after saturation with a binder and subsequent hardening of the binder have been sliced into or formed into friction elements. Because of necessity in saturation of the thick mass, the utilization of binders of the gummy type which have been demonstrated to be the most satisfactory for present day friction materials has been seriously limited or precluded, and further because it has been found that for certain uses requiring a high coefficient of friction with smooth action, it is undesirable to saturate the asbestos itself. Windings of precoated yarn and narrow asbestos tape with rubber compounds requires the use of asbestos yarns or expensive cloth, costing many times more than the sheeted base used in the process and product of this invention, and it is therefore highly uneconomical in contrast therewith. Further, because of the necessity of using costly long asbestos fiber there is wastage attendant upon conversion of this yarn or fibre into cloth, and in addition thereto there is entailed an excess of labor.

While in my co-pending application Serial No. 164,754 I have disclosed the use of a convoluted strip of sheeted fibrous base for the formation of a convoluted annular structure and which I have found to be eminently suited for the purposes therein contemplated, I have found that the use of the sheeted fibrous base alone is not altogether satisfactory for the formation of windings of the chevron or similar types as set forth in Patent No. 2,096,692, and that for the purpose of forming such windings it is desirable that with the use of the sheeted fibrous base herein contemplated, a reenforcement be applied thereto.

It is therefore the object of this invention to produce an annular friction element formed of a convolutely wound shaped and internested strip of fibrous base material which has been reenforced so that it can be wound in such a manner.

Another object is to produce an endless friction facing construction which is essentially of non-woven material although of reenforced construction, and yet which entails great economy over the use of constructions heretofore proposed.

Other objects relate to the provision of a clutch facing which has great durability, great resistance to friction at high speeds, has a high spinning strength which does not have a deleterious effect on the cooperative engaging portions of automobile clutches, and which has desirable friction characteristics. Other objects and benefits of my invention, together with various other economies, relating to the arrangement of parts and details of construction will be apparent from the following specification and drawings, wherein, Fig. 1 is a diagrammatic side elevational view of a form of apparatus for impregnating and combining the component parts to result in the formation of reenforced material suitable for the winding of friction elements herein contemplated.

Fig. 2 is a perspective view with parts broken away illustrating the composite sheet formed by the apparatus shown in Fig. 1.

Fig. 3 is a plan view of a portion of a strip severed from the sheet shown in Fig. 2, such as may be used for the formation of a single winding.

Fig. 4 is a section at the line 4—4 on Fig. 3.

Figure 5:
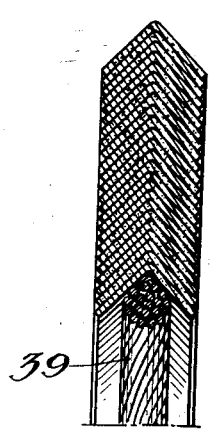
Fig. 5 is a partial section of a clutch facing winding having an inverted V-shape formation before compression and cure.

Referring to the apparatus diagrammatically shown in Fig. 1, 10 indicates a roll of heat resisting or heat indestructable sheeted fibre base such as for example, asbestos paper, and which is usually provided in a thickness of .015 inch. This asbestos paper may then be led by means of the guide roll 11, through an alcoholic solution of phenol resin or other saturant 12 contained in the tank 13 and withdrawn therefrom by means of the draw rolls 14 and 15 and looped through the dryer 16 by means of the rolls, 17, 18 and 19 to expel the solvent and to dry the strip. The solution strength is preferably regulated so as to obtain a resin solids content of about 10 percent in the paper which is treated and dried at this stage. The amount of resin may, of course, be varied and the type of solution or saturant may be changed within requisite and suitable limits, the purpose of the saturation being to increase the strength of the paper so as to permit it to resist handling, bending, folding or the like without tearing, cracking or disintegrating. However, the use of phenol resins tends to decrease or lower frictional characteristics. Therefore, a substitute may comprise a resin oil combination to impart desirable and necessary strength to the paper as well as desirable frictional characteristics. On the other hand, when the eventual product must possess a high coefficient of friction, this entire initial saturation step may be omitted if desired.

The sheet of asbestos paper which may have been preimpregnated as above set forth, is then carried over the rollers 20, 21, 22 and 23 through a solution of a cement or rubber filler compound 24 contained in the trough 25. Simultaneously with the passage and impregnation of the paper sheet in the trough 25, a woven textile fabric of a light weight and open-work construction such as for example, gauze bandage, is carried around the rollers 27, 28, 29 and 30, through this same thermo-plastic, thermo-setting binder compound 24. As the impregnated paper and the impregnated gauze leave the impregnant, they are brought together through the pair of wiper rolls 31 and 32 which remove excess compound and leave a controlled amount on the composite sheet of paper and textile fabric, suitable means, not shown, being provided for the regulation of these wiper rolls to yield such control. The composite sheet is then further consolidated and dried by being looped through the dryer 33 over the rollers 34, 35 and 36. It is to be understood that one or both faces of the asbestos paper sheet may be covered with this textile fabric in the same manner.

The paper used may be an asbestos base material containing a minimum of cellulose fiber and may if desired be strengthened in the formation thereof by the introduction of sizing or binding materials such as starch, glue or synthetic resins, latex, or synthetic rubber, and which may be accomplished by beater methods or dry web or wet web saturation methods. Also other modifying ingredients such as inorganic, organic or metallic fillers or solid asphalts or the like may be introduced into the paper by various known methods to vary its strength or frictional properties so as to impart desired characteristics to the finished products. While I prefer the use of a rubber filler compound in a suitable solvent such as gasoline, in the form of a gasoline cement, other thermoplastic and thermosetting binders may be used such as synthetic halogenated rubbers, gummy synthetic resins, highly oxidized vegetable oils and bitumens and the like compounded with suitable fillers for friction material use.

After the asbestos paper and gauze have been consolidated and dried they may be wound up in rolls and either before or after winding may be suitably cut and severed by means of a Cameron slitter or other suitable device, into strips of suitable winding width for a single element, as for example, at the dotted line 37 to produce a strip width shown in Fig. 3. It is of course to be understood that the width shown in Fig. 3 is not of scale size but is merely diagrammatic. Likewise the thickness of the asbestos paper, and especially that of the gauze fabric bonded thereto is highly exaggerated as shown in the drawings for the purposes of illustration and clearness. If desired the asbestos paper sheet may be pre-perforated with a series of openings 38 so that the bonding compound may more readily permeate the sheet and form a stronger bond between it and the fabric.

Figure 7:
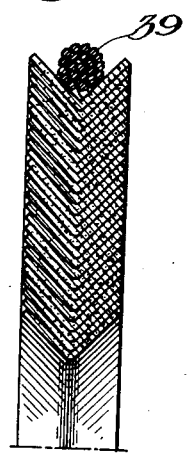
Fig. 7 is a view similar to that shown in Fig. 5 of a V-shaped winding.
Figure 8:
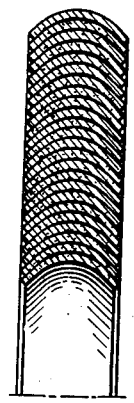
Fig. 8 is a view similar to that of Fig. 7 illustrating a curved or U-shaped winding.
Figure 9:
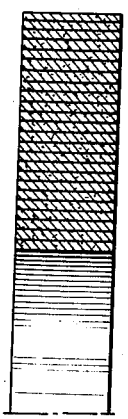
Fig. 9 is a partial section of a clutch facing winding before compression and cure, wherein the windings have been laid flat and without any cross-sectional deformation.
Figure 6:
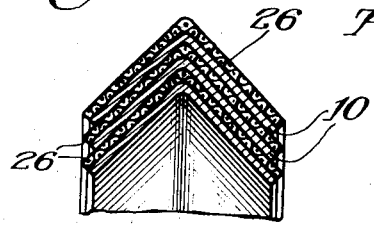
Fig. 6 is an enlarged view of a portion of the windings shown in Fig. 5, being wound in a similar manner thereto, illustrating the details of construction of the composite, wound strips.
Figure 12:
Fig. 12 is a section on the line 12—12 of Fig. 11.
Figure 10:
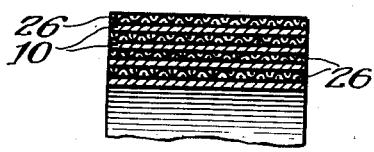
Fig. 10 is an enlarged view of a portion of the windings shown in Fig. 9 illustrating the compound structure of the winding strip.
Figure 11:
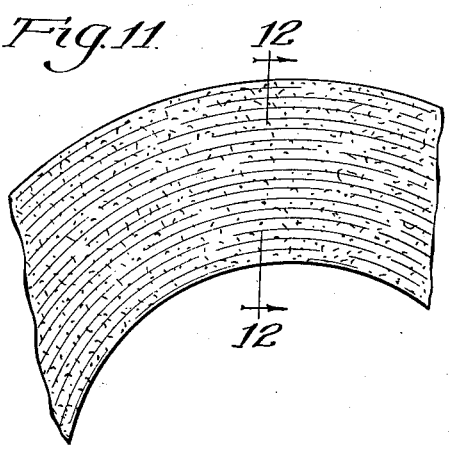
Fig. 11 is a fragmentary view of the face of the clutch facing element after compression and cure.
Figure 13:
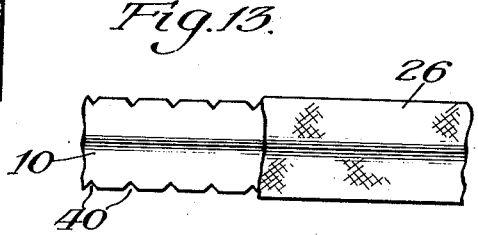
Fig. 13 is a plan view of a longitudinally folded strip portion with parts broken away and illustrating notch formations on the underlying asbestos paper strip.
Figure 14:
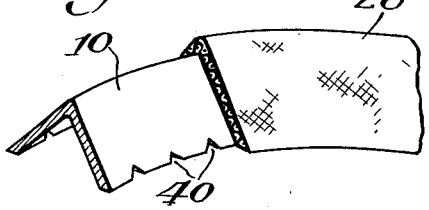
Fig. 14 is an exaggerated perspective view of the strip section shown in Fig. 13.

After the composite sheet has been formed in the manner hereinbefore set forth and the strips separated therefrom into widths of one-half to one inch wide, more or less, suitable for preparing single width thickness windings, the strips are passed through a suitable device to fold it longitudinally and to produce in the strip a nonplanar but symmetrical cross section, such as, for example, the V or inverted V chevron formations shown in Patent No. 2,096,692 or a curved or U-shape, after which an annular element is formed by convolutely winding the strip in internested relationship on a mandrel or other form. For the purpose of adding strength to the element there may be wound therewith a continuous metallic foil or strip of wire such as for example, brass, copper, zinc, lead, etc., or strands of asbestos yarn with or without wire. These materials may be fed into the folds as the element is being wound in order to impart additional resistance against bursting under high centrifugal force. The winding of the convolutions is conducted so as to form the inner periphery of the annulus first and then adding sufficient convolutions thereto to build up the radius to the predetermined size. The windings are conducted in the same manner whether the open portion of the V or U extends inwardly or outwardly as shown in Figs. 5, 7 and 8. In order to form an element that has both a strong inner and outer edge, I find it desirable to insert a coil formed of asbestos yarn which may or may not include conventional wire reenforcement and which may be impregnated with the same rubber compound or other binder used to impregnate the strips from which the annulus has been wound, into the seat formed by the spaced apart legs of the U or V formations, whether it be in the interior or the outer peripheral edge. While I have shown a limited number of convolutions in Figs. 5, 7, 8 and 9 of the drawings, it is understood that these figures are merely illustrative and that the strips of material formed of the composite asbestos paper and gauze including filler compound which comprises 50 to 60 percent by weight thereof are thin, and that in actual practice the number of convolutions may be 50 and upwards.

In the winding of the individual elements, while too great an amount of tension is avoided during the winding stage, a certain amount of tension is required in order to retain the coils in their internested relation and in order to handle the coils for further treatment. The use of an impregnated strip of paper such as asbestos paper herein contemplated, even though it may be of itself reenforced with for example, a phenolic resin, will not be sufficiently strong to withstand longitudinal deformation and convolute winding under even slight tension, without the tearing of the strip or the parting of the fibers thereof, all of which may result in an irregular and improperly wound element having areas and thicknesses of non-uniform construction or density. Another reason for the breaking or tearing of an ordinary strip of paper when wound in a manner set forth in Patent No. 2,096,692 such as is herein contemplated, is that the folded strip is required to conform to a ring of varying diameter and in order to produce a good winding the amount of tension either exerted thereon or internally produced is such as tends to conform the folded strip to a ring having a diameter of its mean diameter. Thus in an inverted V winding there is a tendency of the inner edges to buckle and a tendency of the apex or longitudinal ridge to tear and part. And likewise inverse effects will result from the V winding, and of course similar effects result from the various curved or U shapes. It will thus be seen that the use of the flexible woven material even though it be a light weight and open construction and in an amount insufficient to substantially change the characteristics of the desirable asbestos paper, by being bound thereto, it will hold the base paper sheet in proper formation even though strained areas may occur therein. In this respect it is important that when the paper sheet is covered on only one side with the gauze that the gauze likewise be on the outer or exterior surface of the winding as shown in detail sections of Figs. 6, 10, 13 and 14, thus regardless of whether the edges of the folded strip extend outwardly or inwardly the winding is made such that the fabric covering is likewise external or on the outer side of the strip as it is being wound.

It may also be found desirable to provide the strips from which the elements are wound with notched cuttings or formations along its edges, which for example, may be accomplished by a pinking device or other suitable apparatus. If the composite strips are made from single width thicknesses of paper, these paper strips may be pre-notched as at 40, shown in Figs. 13 and 14, or if the composite strips are formed from a multiple width sheet formed as shown in Fig. 2 herein, the composite strip itself may be notched along its edges by cutting suitable wedges therefrom. Such edge formation is particularly suitable for the formation of inverted V or inverted U convoluted windings in the manner herein contemplated, and permits windings to be made without exerting any undue tension thereon during the winding step and at the same time eliminates any necessity for buckling the edges of the strip or forcing the convolutions to conform to an annulus of the mean diameter of the folded and internestingly wound strip.

After the windings have been made in any of the manners hereinbefore set forth, the coils may be consolidated by suitable pressure and mild heat to plasticize the binder and enable the element to be handled for further treatment. The element may then be placed in a suitable mold to compress it axially to give it the proper thickness and to expand it radially to give it the proper dimensions, heat being applied at the same time to set and harden the binder, or the wound element may be consolidated and cured in any other desirable manner or by any other series of steps, after which it may be ground down to proper thickness and furnished with suitable attaching openings by which it may be installed for service.

I claim as my invention:

1. A friction element suitable for a clutch facing comprising an annular body formed of a convoluted composite strip comprising a thin fibrous heat resisting sheeted fibrous base material and at least an outer layer of open mesh textile fabric material, the said strip being treated with a heat hardenable binder, the said element being compressed to consolidate the convolutions upon each other, and heat treated to harden the binder.

2. A friction element suitable for a clutch facing comprising an annular body formed of a convoluted composite strip comprising a thin phenolic resin reinforced heat resisting sheeted fibrous base material and at least an outer layer of open mesh textile fabric material, the said strip being treated with a heat hardenable binder, the said element being compressed to consolidate the convolutions upon each other, and heat treated to harden the binder.

3. A friction element suitable for a clutch facing comprising an annular body formed of a convoluted composite strip comprising a thin fibrous heat resisting sheeted fibrous base material and at least an outer layer of open mesh textile fabric material, the said strip being treated with a heat hardenable binder and the convolutions thereof being secured together in internesting relationship, the said element being compressed to consolidate the convolutions upon each other, and heat treated to harden the binder.

4. A friction element suitable for a clutch facing comprising an annular wound body formed of a convoluted composite strip comprising a thin fibrous heat resisting sheeted fibrous base material and at least an outer layer of open mesh textile fabric material, the said strip being treated with a heat hardenable binder and being longitudinally folded to provide a symmetrical cross sectional form, the convolutions of said element being wound in internesting relationship, and the resultant peripheral fold depression seating a coil comprising binder treated asbestos yarn, the said element being compressed to consolidate the windings thereof and heat treated to harden the binder.

5. A friction element suitable for a clutch facing comprising an annular wound body formed of a convoluted composite strip comprising a thin fibrous heat resisting sheeted fibrous base material and at least an outer layer of open mesh textile fabric material, the said strip being treated with a heat hardenable binder and being longitudinally folded to provide a symmetrical cross sectional form, the convolutions of said element being wound in internesting relationship, and carrying a continuous reinforcing strip between the folds thereof, and the resultant peripheral fold depression seating a coil comprising binder treated asbestos yarn, the said element being compressed to consolidate the windings thereof and heat treated to harden the binder.

6. A friction element suitable for a clutch facing comprising an annular body formed of a convoluted composite strip comprising a non-woven fibrous material and at least an outer layer of woven textile fabric material, the said strip being treated with a heat hardenable binder, the said element being compressed to consolidate the convolutions upon each other, and heat treated to harden the binder.

7. A friction element suitable for a clutch facing comprising an annular body formed of a convoluted composite strip comprising a non-woven fibrous material and at least an outer layer of woven textile fabric material, the said strip being treated with a heat hardenable binder and the convolutions thereof being secured together in internesting relationship, the said element being compressed to consolidate the convolutions upon each other, and heat treated to harden the binder.

8. The method of forming a friction element suitable for a clutch facing, which comprises, convolutely winding a composite strip comprising a thickness of non-woven fibrous material and a thickness of woven textile fabric, said strip being impregnated with a thermo-plastic heat hardenable binder compound, shaped to provide longitudinally extending recessed and projecting portions on the oppoite sides of said strip; and wound coils of internesting relationship to form an annular body while maintaining the textile fabric thereof in outward formation; and subjecting the said body to heat and pressure to consolidate it and harden the binder thereof.

9. The method of forming a friction element suitable for a clutch facing, which comprises, convolutely winding a composite strip comprising a thickness of non-woven fibrous material and a thickness of woven textile fabric, said strip being impregnated with a thermo-plastic heat hardenable binder compound, shaped to provide longitudinally extending recessed and projecting portions on the opposite sides of said strip, and wound coils of internesting relationship to form an annular body while maintaining the textile fabric thereof in outward formation, and subjecting the said body to heat and pressure to consolidate it and harden the binder thereof.

10. The method of forming a friction element suitable for a clutch facing, which comprises, convolutely winding a composite strip comprising a thickness of non-woven fibrous material and a thickness of woven textile fabric, said strip being impregnated with a thermo-plastic heat hardenable binder compound, shaped to provide longitudinally extending recessed and projecting portions on the opposite sides of said strip and wound in coils of internesting relationship to form an annular body while maintaining the textile fabric thereof in outward formation, nesting a strand comprising binder impregnated asbestos yarn within the peripheral recess of said body to substantially fill said recess, and subjecting the said body to heat and pressure to consolidate it and harden the binder thereof.

11. The method of forming a friction element suitable for a clutch facing, which comprises, convolutely winding a composite strip comprising a thickness of non-woven fibrous material and a thickness of woven textile fabric, said strip being impregnated with a thermo-plastic heat hardenable binder compound, shaped to provide longitudinally extending recessed and projecting portions on the opposite sides of said strip; and wound in coils of internesting relationship to form an annular body while maintaining the textile fabric thereof in outward formation, simultaneously feeding into the folds thereof a continuous reinforcing strip comprising asbestos yarn, and subjecting the said body to heat and pressure to consolidate it and harden the binder thereof.

12. The method of forming a friction element suitable for a clutch facing, which comprises, convolutely winding a composite strip comprising a thickness of non-woven fibrous material and a thickness of woven textile fabric, said strip being impregnated with a thermo-plastic heat hardenable binder compound, shaped to provide longitudinally extending recessed and projecting portions on the opposite sides of said strip; and wound in coils of internesting relationship to form an annular body while maintaining the textile fabric thereof in outward formation, simultaneously feeding into the folds thereof a continuous strip comprising metal, and subjecting the said body to heat and pressure to consolidate it and harden the binder thereof.

13. The method of forming a friction element suitable for a clutch facing, which comprises, convolutely winding a composite strip comprising a thickness of non-woven fibrous material and a thickness of woven textile fabric, said strip being impregnated with a thermo-plastic heat hardenable binder compound, shaped to provide longitudinally extending recessed and projecting portons on the opposite sides of said strip; and wound in coils of internesting relationship to form an annular body while maintaining the textile fabric thereof in outward formation, simultaneously feeding into the folds thereof a continuous strip comprising metal, nesting a strand comprising binder impregnated asbestos yarn within the peripheral recess of said body to substantially fill said recess, and subjecting the said body to heat and pressure to consolidate it and harden the binder thereof.

14. The method of forming a friction element suitable for a clutch facing, which comprises, convolutely winding a composite strip comprising a thickness of non-woven fibrous material and a thickness of woven textile fabric, said strip being impregnated with a thermo-plastic heat hardenable binder compound, shaped to provide longitudinally extending recessed and projecting portions on the opposite sides of said strip, and formed with regularly spaced notches on the edges of said strip, and wound in coils of internesting relationship to form an annular body while maintaining the textile fabric thereof in outward formation, and subjecting the said body to heat and pressure to consolidate it and harden the binder thereof.

15. The method of forming a friction element suitable for a clutch facing, which comprises, convolutely winding a composite strip comprising a thickness of non-woven fibrous material and a thickness of woven textile fabric, said strip being impregnated with a thermo-plastic heat hardenable binder compound, shaped to provide longitudinally extending recessed and projecting portions on the opposite sides of said strip, and formed with regularly spaced notches on the edges of said strip, and wound in coils of internesting relationship to form an annular body while maintaining the textile fabric thereof in outward formation, nesting a strand comprising binder impregnated asbestos yarn within the peripheral recess of said body to substantially fill said recess, and subjecting the said body to heat and pressure to consolidate it and harden the binder thereof.

16. The method of forming a friction element suitable for a clutch facing, which comprises, convolutely winding a composite strip comprising a thickness of non-woven fibrous material and a thickness of woven textile fabric, said strip being impregnated with a thermo-plastic heat hardenable binder compound, shaped to provide longitudinally extending recessed and projecting portions on the opposite sides of said strip; and wound in coils of internesting relationship to form an annular body while maintaining the textile fabric thereof in outward formation, nesting a strand comprising binder impregnated asbestos yarn within the peripheral recess of said body to substantially fill said recess, and subjecting the said body to heat and pressure to consolidate it and harden the binder thereof.

MORTON F. JUDD.